United States Patent
Abe et al.

(10) Patent No.: US 7,650,287 B2
(45) Date of Patent: Jan. 19, 2010

(54) REGIONAL ATTRIBUTE DETERMINATION METHOD, REGIONAL ATTRIBUTE DETERMINATION DEVICE, AND REGIONAL ATTRIBUTE DETERMINATION PROGRAM

(75) Inventors: Yuichi Abe, Tokyo (JP); Kenichiro Nakamura, Saitama (JP); Norikazu Hiraki, Kanagawa (JP); Ryoichi Imaizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 1090 days.

(21) Appl. No.: 10/847,148

(22) Filed: May 17, 2004

(65) Prior Publication Data

US 2004/0230452 A1 Nov. 18, 2004

(30) Foreign Application Priority Data

May 15, 2003 (JP) ............................ P2003-136761

(51) Int. Cl.
*G06Q 10/00* (2006.01)
(52) U.S. Cl. .......................................................... 705/1
(58) Field of Classification Search .................... 705/1
See application file for complete search history.

(56) References Cited

U.S. PATENT DOCUMENTS

| | | | | |
|---|---|---|---|---|
| 6,590,526 | B1 * | 7/2003 | Grube et al. | 342/357.07 |
| 6,834,252 | B2 * | 12/2004 | Yokota | 702/150 |
| 2001/0031640 | A1 * | 10/2001 | Waller et al. | 455/456 |
| 2002/0002600 | A1 * | 1/2002 | Yamada et al. | 709/219 |
| 2002/0111816 | A1 * | 8/2002 | Lortscher et al. | 705/1 |
| 2003/0171975 | A1 * | 9/2003 | Kirshenbaum et al. | 705/10 |
| 2004/0073482 | A1 * | 4/2004 | Wiggins et al. | 705/14 |

FOREIGN PATENT DOCUMENTS

| | | |
|---|---|---|
| JP | 10-185609 | 7/1998 |
| JP | 2001-92853 | 4/2001 |
| JP | 2001-282831 | 10/2001 |
| JP | 2003-030373 | 1/2003 |
| JP | 2003-091629 | 3/2003 |
| JP | 2003-122908 | 4/2003 |

OTHER PUBLICATIONS

"Space Tag: Objects with Spatio-Temporally Limited Access" in Interactive Systems and Software VI, Kindai Kagakusha pp. 1-10, 1998, written by Hiroyuki Tarumi, Ken Morishita, Megumi Nakao, and Yahiko Kambayashi (Non-patent Document 1).
"Semantic Web to Sono Ouyou" [Online] Oct. 30, 2002 OSPG by Hiroshi Tsuda, URL: http://net.intap.or.jp/INTAP/s-web, (c) 2002 Fujitsu Laboratories Ltd.
"Metadata to Sono Ouyou" written by Hiroshi Tsuda, (c) 2002 INTAP.
"Semantic Web wa Dousureba Hontouni Tsukaeruka?" written by Hironobu Kuruma, (c) 2002 INTAP.

* cited by examiner

*Primary Examiner*—John G Weiss
*Assistant Examiner*—Candice D Carter
(74) *Attorney, Agent, or Firm*—K & L Gates LLP

(57) ABSTRACT

In a regional attribute determination method for determining a regional attribute representing an attribute of people gathering in each region, user information including the locations and attributes of a number of users is acquired from a number of portable information terminal devices used by the number of users, the acquired user information of the number of users is stored in a user information storage part, and the regional attribute is determined on the basis of the user information of the number of users stored in the user information storage part.

2 Claims, 19 Drawing Sheets

FIG. 3
| | FIELD | OBJECT |
|---|---|---|
| ENTER |  |  |
| DIRECT |  | |
| RELEASE |  | 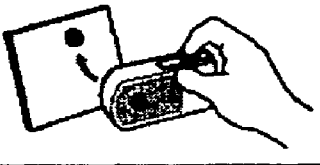 |

| USER ID | LOCATION | AGE | SEX | HOBBIES/INTERESTS |
|---------|----------|-----|-----|-------------------|
| 0053 | (24, 135, 100) | 20 | MALE | MUSIC |
| 1902 | (35, 122, 20) | 28 | FEMALE | MOVIE |
| 0055 | (44, 136, 530) | 36 | MALE | EATING AT VARIOUS RESTAURANTS |
| ... | ... | ... | ... | ... |

FIG. 12

| ID | ATTRIBUTE OF "FIELD" ||||| ATTRIBUTE FOR DISPLAY | ELECTRONIC INFORMATION |
|---|---|---|---|---|---|---|---|
| | LOCATION | EFFECTIVE AREA | ACCESS RIGHT | CATEGORY | | ICON | |
| 1 | (35, 145, 300) | 200 | groupA | Music (R&B) | | MusicA | Music/R&B/ textA |
| 2 | (33, 138, 50) | 50 | userB | Movie | | MovieA | Movie/ imageA |
| 3 | (34, 135, 500) | 1000 | public | Restaurant | | RestaurantB | Restaurant/ advertisementB |
| ... | ... | ... | ... | ... | | ... | ... |

150

A = 0.98

A = 0.46

σ = 0.93

σ = 0.52

REGIONAL ATTRIBUTE DETERMINATION METHOD, REGIONAL ATTRIBUTE DETERMINATION DEVICE, AND REGIONAL ATTRIBUTE DETERMINATION PROGRAM

BACKGROUND OF THE INVENTION

The present invention relates to regional attribute determination methods, regional attribute determination devices, and regional attribute determination programs, and more particularly, to a regional attribute determination method, a regional attribute determination device, and a regional attribute determination program that automatically determine an attribute of a region surrounding a portable information terminal device on the basis of the location of the portable information terminal device in the real world.

Nowadays, information processing technologies and information communication technologies are highly developed, and information equipment, such as personal computers and portable information terminal devices, is unevenly distributed not only in offices and houses but also everywhere in the real world. Such information equipment is capable of being connected to the Internet via a wired network or a wireless network. Access to a Web server or the like via the Internet enables access to an enormous amount of data.

Thus, the use of the above-mentioned information equipment enables users to acquire information in various places. However, how efficiently users can acquire necessary information from among the enormous amount of information is an important issue in such circumstances.

In order to solve the issue, various technologies for selecting and displaying information on the basis of the time and location of a user have been suggested.

For example, a technology in which a portable information terminal device detects its own location and retrieves and selectively outputs local information on the basis of the detected location information is disclosed in Japanese Unexamined Patent Application Publication No. 10-185609 (Patent Document 1). This is a technology for providing information in accordance with location.

In another example, a technology in which electronic information, such as text, images and voices, is registered together with a predetermined place and predetermined time, and in which related electronic information is displayed only to a user who is in the registered place at the registered time, is disclosed in "SpaceTag: Objects with Spatio-Temporally Limited Access" in Interactive Systems and Software VI, Kindai Kagakusha pp. 1-10, 1998, written by Hiroyuki TARUMI, Ken MORISHITA, Megumi NAKAO, and Yahiko KAMBAYASHI (Non-patent Document 1). This is a technology for providing information in accordance with the combination of time and space.

Furthermore, a technology in which not only space and time information but also physical environment around a user, such as temperature, humidity, and speed, is associated with electronic information in order to display registration information only when the user is in the same physical environment again is disclosed in Japanese Unexamined Patent Application Publication No. 2001-92853 (Patent Document 2). In this technology, allowing a margin for the value of environmental information eases the conditions, so that the registration information can be displayed in an environment similar to the environment at the registration.

With such technologies described above, information can be provided in accordance with an attribute (hereinafter, referred to as a physical attribute) that can be detected as physical values, such as location, time and humidity.

In addition to a technology for providing information, a technology for efficiently collecting utilizable information is also needed. In other words, due to an increase in the number of Web pages available on the Internet, there is a large quantity of information around us. In such a society with excessive information, how efficiently users can collect desired information is an important issue.

T. Berners-Lee, who invented the Web, proposed a concept referred to as "the Semantic Web." The Semantic Web has an expanded function of the current Web. According to technologies of the Semantic Web, by adding "meta data" readable by a computer to a Web page, information required by a user intentionally or unintentionally can be automatically and efficiently retrieved. For example, with the Semantic Web, the property of a region corresponding to the location of a user is analyzed, so that regional information can be presented. (See "Semantic Web to Sono Ouyou" [Online], Oct. 30, 2002, OSPG Kiban Gijutsu Kenkyu Bukai, written by Hiroshi TSUDA, Searched on Apr. 15, 2003, the Internet <URL: http://net.intap.or.jp/INTAP/s-web/data/ospg/ospg-tsuda.pdf> (Non-patent Document 2); "Metadata to Sono Ouyou" [Online], written by Hiroshi TSUDA, Searched on Apr. 15, 2003, the Internet <URL: http://www.net.intap.or.jp/INTAP/s-web/data/conference2002/tsuda.pdf> (Non-patent Document 3); and "Semantic Web wa Dousureba Hontouni Tsukaeruka?" [Online], written by Hironobu KURUMA, Searched on Apr. 15, 2003, the Internet <URL: http://www.net.intap.or.jp/INTAP/s-web/data/conference2002/kuruma.pdf> (Non-patent Document 4).)

However, in the known technologies, a tendency of an attribute of people gathering in each region cannot be determined.

For example, in the technology according to Patent Document 1, since information can be associated with each region in the real world, such as Shibuya or Shinjuku (regions in Tokyo), local information can be displayed. For example, information about Shibuya is displayed when a user arrives in Shibuya, and information about Shinjuku is displayed when a user arrives in Shinjuku. However, the types of people who gather in Shibuya or Shinjuku cannot be known. Thus, an advertisement for people in their twenties cannot be displayed in a region where people in their twenties gather. Also, music information cannot be displayed in a region where people gather who like music.

In other words, although electronic information can be associated with location information, which is geographical, such as Shibuya or Shinjuku, it is difficult to determine the effectiveness of the associated information corresponding to its semantic content. For example, under the assumption that "people in their twenties gather in Shibuya," an advertisement for people in their twenties has been associated with a region in the real world, such as Shibuya. However, in order to confirm such an assumption, a large volume of marketing information must be collected. Furthermore, since marketing information associated with fashion changes over time, the latest information must always be acquired.

Also, in the technology according to Non-patent Document 1, although a user can freely associate electronic information with location information, the user cannot know an effective place to accomplish a purpose. For example, it is more effective for information, such as "Anyone want a puppy?", to be associated with a region where people gather who like dogs. Also, if a user wants to find a new fishing spot, the user wants to search for a fishing spot in a region where people who like fishing gather.

Also, in the technology according to Patent Document 2, electronic information can be associated with environmental information, such as altitude, temperature, humidity and speed, including location information. However, as in the technology according to Non-patent Document 1, although physical information about the location can be known, the regional property of the location cannot be known.

Furthermore, in the Semantic Web shown in Non-patent Documents 2 to 4, although metadata must be prepared in advance, it is difficult to add metadata to all the Web information. Also, although research about automatically adding metadata has been carried out, such information is static. For example, for extraction of the regional property, it is possible to select a Web page associated with a postcode or an address and to extract the regional property on the basis of the metadata. However, this information (that is, regional property) is the property of the region at the time when the Web page or the metadata is created. Although users strongly want to acquire the regional property and regional information in real time, irrespective of whether or not the users are located in the region, there is no way other than asking someone who is in the region over the phone or observing the state of the region by a camera set in a particular place to acquire the regional property in real time.

Also, there may be regional information varying in accordance with the movement of the surrounding users. For example, since regional attributes, such as "a region where people gather who are in their twenties" and "a spot where people gather who like music," change in real time depending on the gathering of a number of users, procedures for asking each user over the phone and for counting the number of people who are shown in a fixed camera are not realistic.

SUMMARY OF THE INVENTION

Accordingly, it is an object of the present invention to provide a regional attribute determination method, a regional attribute determination device, and a regional attribute determination program capable of automatically determining semantic attribute information of a region where users of a number of portable information terminal devices are located on the basis of the location relationship of the number of portable information terminal devices in the real world.

In order to achieve the above object, a regional attribute determination method according to the present invention for determining a regional attribute representing an attribute of people gathering in each region includes the steps of: acquiring user information including the locations and attributes of a number of users from a number of portable information terminal devices used by the number of users; storing the acquired user information of the number of users into a user information storage part; and determining the regional attribute on the basis of the user information of the number of users stored in the user information storage part.

According to the regional attribute determination method, user information of a number of users is acquired from a number of portable information terminal devices, so that a regional attribute of each region is determined on the basis of the acquired number of pieces of user information.

Also, in order to achieve the above object, a regional attribute determination device according to the present invention for determining a regional attribute representing an attribute of people gathering in each region includes: a user information acquiring part for acquiring user information including the locations and attributes of a number of users from a number of portable information terminal devices used by the number of users; a user information storing part for storing the user information of the number of users acquired by the user information acquiring part; and a regional attribute determining part for determining the regional attribute on the basis of the user information of the number of users stored in the user information storing part.

According to the regional attribute determination device, user information of a number of users is acquired from a number of portable information terminal devices by a user information acquiring part. The acquired user information is stored in a user information storing part. A regional attribute of each region is determined on the basis of the acquired number of pieces of user information by a regional attribute determining part.

Also, in order to achieve the above object, a regional attribute determination program according to the present invention for determining a regional attribute representing an attribute of people gathering in each region causes a computer to execute: an acquiring step of acquiring user information including the locations and attributes of a number of users from a number of portable information terminal devices used by the number of users; a storing step of storing the acquired user information of the number of users into a user information storage part; and a determining step of determining the regional attribute on the basis of the user information of the number of users stored in the user information storage part.

According to the regional attribute determination program executed by a computer, user information of a number of users is acquired from a number of portable information terminal devices, and a regional attribute of each region is determined on the basis of the acquired number of pieces of user information.

As described above, according to the present invention, a number of pieces of user information is acquired from a number of portable information terminal devices, so that a regional attribute of each region is determined on the basis of the acquired number of pieces of user information. Thus, semantic attribute information of the region in which each of the portable information terminal devices is located can be automatically determined on the basis of the location of each of the portable information terminal devices in the real world and the user information.

Additional features and advantages of the present invention are described in, and will be apparent from, the following Detailed Description of the Invention and the Figures.

BRIEF DESCRIPTION OF THE FIGURES

FIG. 3 shows the relationship among "action," "field," and "object."

FIG. 12 shows an example of the data structure of a registration information storage part.

DETAILED DESCRIPTION OF THE INVENTION

Embodiments of the present invention will be described with reference to the drawings.

First, an overview of the present invention will be briefly described, and then the specific details of the embodiments according to the present invention will be described.

Figure 1:
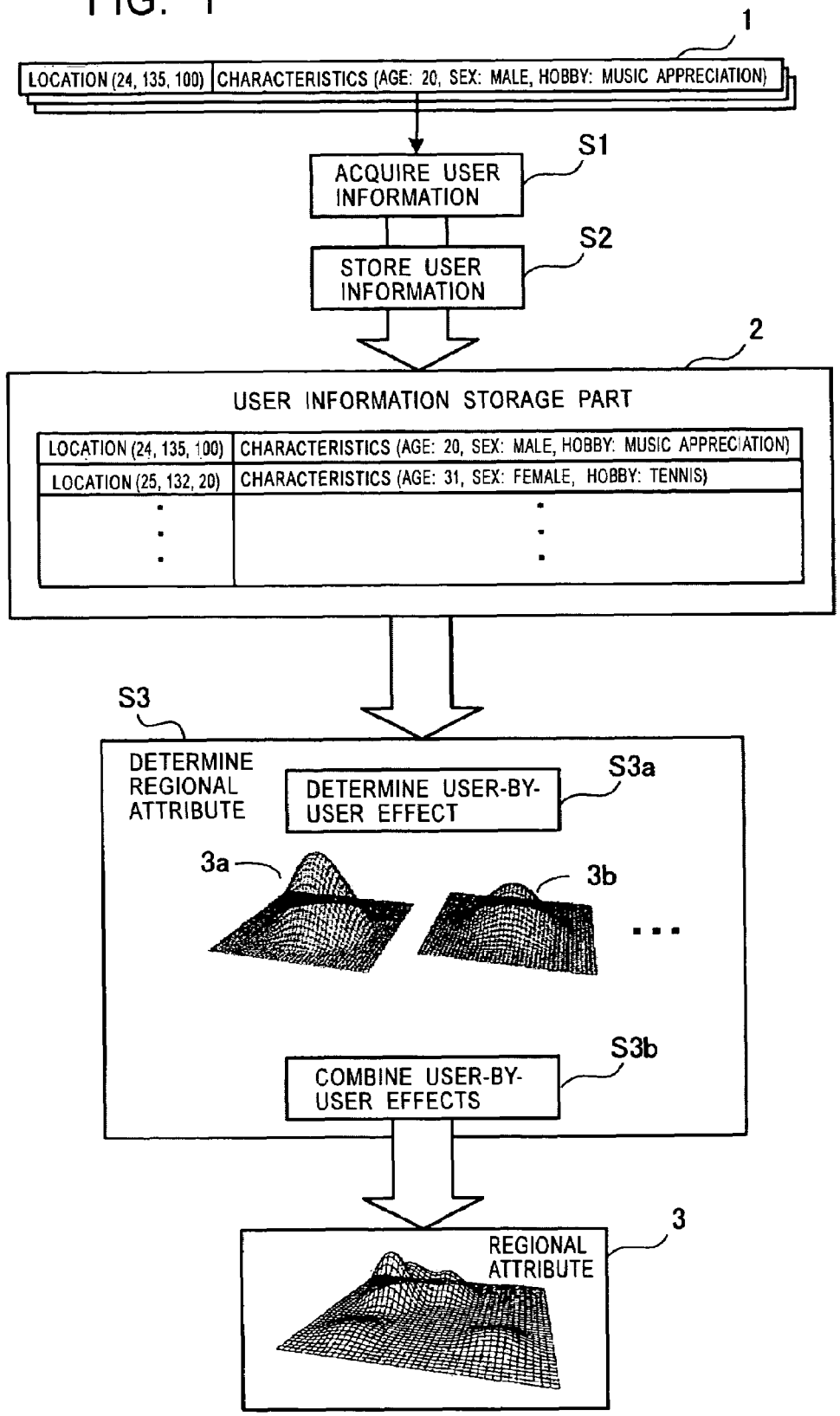
FIG. 1 is a conceptual diagram of the present invention.

FIG. 1 is a conceptual diagram of the present invention. A regional attribute determination method according to the present invention is used to determine a regional attribute representing an attribute of people who gather in a region. The regional attribute determination method is performed as described below.

User information 1 including the locations and attributes of a number of users is acquired from a number of portable information terminal devices used by the number of users (step S1). Information, except for geographical information, is set as an attribute of a user. For example, an attribute includes at least one of the age, sex and hobbies/interests of a user.

The acquired user information 1 about the number of users is stored in a user information storage part 2 (step S2).

A regional attribute 3 representing the tendency of people who gather in each region is determined on the basis of the number of pieces of user information 1 stored in the user information storage part 2 (step S3). Determination processing for the regional attribute 3 includes, for example, user-by-user effect determining processing (step S3*a*) and user-by-user effect combining processing (step S3*b*).

In the user-by-user effect determining processing in step S3*a*, effects 3*a*, 3*b*, on a region produced by respective users are calculated on the basis of the respective pieces of user information 1 by using a regional attribute defining function set in advance. In the user-by-user effect combining processing in step S3*b*, the calculated effects 3*a*, 3*b*, . . . on the region produced by the respective users are combined. For example, the sum of the effects 3*a*, 3*b*, . . . is calculated for each region.

The regional attribute defining function is capable of defining the power of influence corresponding to a user attribute and an effect on a region produced by each user in accordance with the power of influence. For example, the regional attribute defining function is capable of representing an effect on each region by multiplying a predetermined function by the power of influence. In a case where a regional attribute of a region where people gather who are in their twenties is determined, the power of influence of user information of a user who is in his/her twenties is set as 1 and the power of influence of user information of a user who is not in his/her twenties is set as 0. Accordingly, the regional attribute 3 is determined on the basis of user information of users who are in their twenties.

Also, the regional attribute defining function may be a function in which the effects 3*a*, 3*b*, . . . on a region produced by respective users are reduced as the users move away from the region. Furthermore, the regional attribute defining function may define the breadth of the power of influence corresponding to the user attribute. In this case, the regional attribute defining function is a function in which the effect by each of the users is exerted on a region farther away from the location of each of the users as the value representing the breadth of the power of influence increases.

As described above, user information about a number of users is acquired from a number of portable information terminal devices, so that a regional attribute of each region is determined on the basis of the acquired number of pieces of user information. Thus, semantic attribute information of a region where the number of portable information terminal devices is located can be automatically determined on the basis of the locations of the number of portable information terminal devices in the real world and the user information. Also, defining of such a regional attribute can be performed in real time.

In other words, in accordance with the locations of a number of portable information terminal devices and information of users who carry the portable information terminal devices, semantic attributes, such as "a region where many people gather who are in their twenties" and "a region where people gather who like music," other than geographical information, can be defined for regional information. Furthermore, a regional attribute with higher reliability can be defined by changing the power of influence on the regional attribute definition and the breadth of the power of influence on the regional attribute definition for each user. Such regional attributes can be used for advertisements limited to particular users, finding of a region where particular types of users gather, and the like.

The specific details of an embodiment according to the present invention will now be described.

In this embodiment, a regional attribute determination function according to the present invention is applied to a system in which users associate any location in a three-dimensional space with various types of information and in which such information is provided. The concept of such a system for providing information dependent on a place according to this embodiment will be described.

Figure 2:
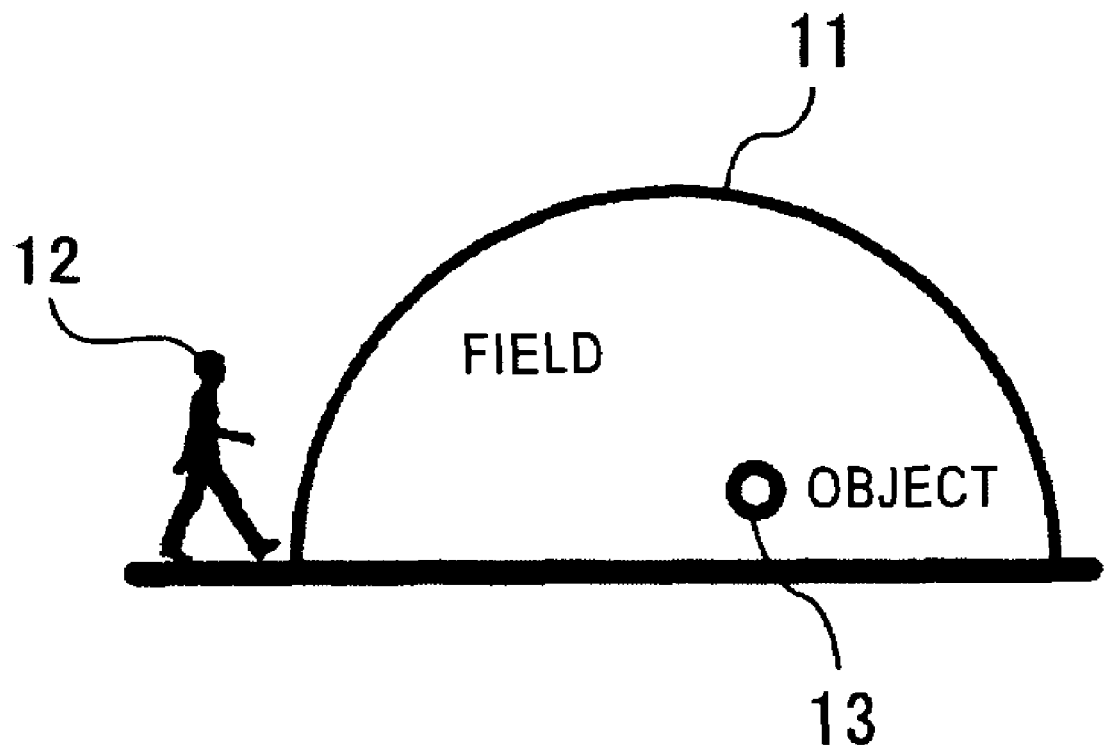
FIG. 2 shows the concept of information management in a system for providing information.

FIG. 2 shows the concept of information management in the system for providing information. Basically, the present invention relates to a method for providing information dependent on a place. The method for providing information dependent on a place is defined by three concepts: "field" corresponding to a place; "object" existing in the "field"; and "action" performed by a user in the "field."

As shown in FIG. 2, the "field" is a virtual closed region 11 with any size existing in the real world. By entering the "field," information corresponding to the "field" is provided. When a user 12 who takes an "action" enters the "field," information associated with a physical object 13 called an "object" in the "field" is provided.

FIG. 3 shows the relationship among "action," "field" and "object". As shown in FIG. 3, the "field" includes "actions," such as "enter," "direct" and "release," performed by a user.

The action "enter" is entering the "field." By entering the "field," information corresponding to the "field" can be received.

The action "direct" is entering the "field" and facing in a certain direction. By facing in a certain direction, information corresponding to the facing direction can be received.

The action "release" is placing information in the "field." By placing information, another user can view the information later.

"Object" includes an object, such as a building, existing in the real world and information added thereto. When a user views the "object," information corresponding to the "object" is provided for the user.

"Object" includes "actions," such as "enter" and "release," performed by a user. The action "enter" is viewing the "object." By viewing the "object," a user can receive information corresponding to the "object." The action "release" is placing information on the "object." By placing the information on the "object," another user can view the information later.

This embodiment relates to such a regional attribute determination method based on information dependent on a place. In particular, this embodiment relates to a method for automatically defining a semantic attribute of a location (or region) except for a geographical attribute on the basis of the location relationship of users in the real world. Also, defining a "field" on the basis of the defined regional attribute enables definition of the "field" not only including a geographical attribute but also including a semantic attribute.

Figure 4:
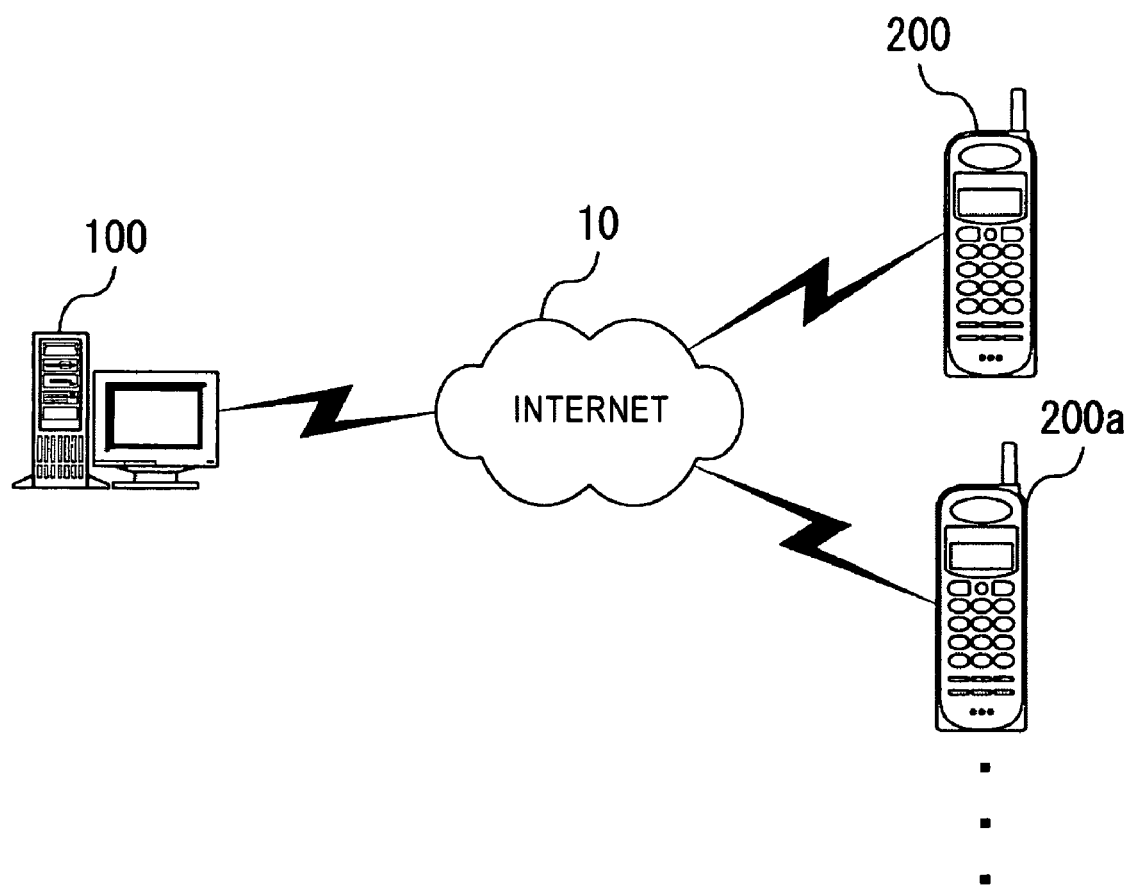
FIG. 4 shows a structural example of the system according to the above-described embodiment.

FIG. 4 shows a structural example of the system according to this embodiment. Referring to FIG. 4, an information management device 100 is connected to a number of portable information terminal devices 200, 200a, . . . via the Internet 10. The information management device 100 collects information from the portable information terminal devices 200, 200a, . . . located in various places and determines regional attributes. The portable information terminal devices 200, 200a, . . . are information terminal devices capable of being carried by users. The portable information terminal devices 200, 200a, . . . have a geodetic function, such as a global positioning system (GPS), to measure its own location.

Figure 5:
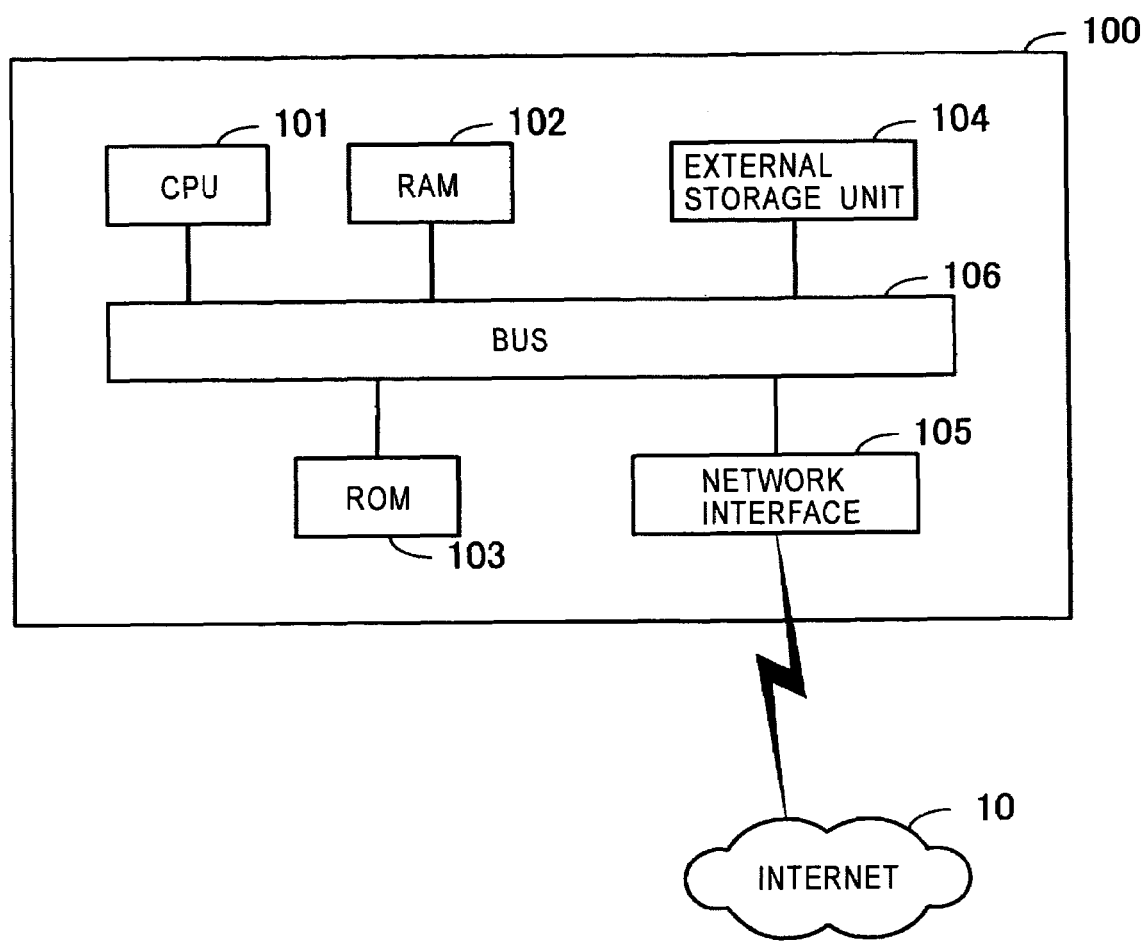
FIG. 5 shows an example of the hardware structure of an information management device.

FIG. 5 shows an example of the hardware structure of the information management device 100. The information management device 100 includes a central processing unit (CPU) 101, a random access memory (RAM) 102, a read only memory (ROM) 103, an external storage unit 104, a network interface 105, and a bus 106 connecting them.

The CPU 101 is a main controller for controlling the whole information management device 100. The CPU 101 executes various programs, such as an application program, under the control of an operating system (OS). For example, the CPU 101 executes an application program in which a semantic attribute of a location (or region) is defined on the basis of the location relationship of the number of portable information terminal devices 200, 200a, . . . .

The RAM 102 is a recording medium functioning as a main storage unit. The RAM 102 is used for loading a program code executed by the CPU 101 and temporarily storing operation data of the execution program.

The ROM 103 is a semiconductor memory for permanently storing data. For example, a self-diagnostic test, such as a power on self test (POST) on start-up, a program code, such as a basic input/output system (BIOS) for hardware input and output, and the like are written in the ROM 103.

The external storage unit 104 is a recording medium for storing a program of an executable file format and various types of data. It is preferable that a storage medium capable of random access, such as a hard disk drive (HDD) or an optical disc, be used as the external storage unit 104. However, the external storage unit 104 may be a storage medium which is weak in random access, such as a tape streamer. Also, the external storage unit 104 may be a non-volatile semiconductor memory typified by a Memory Stick (trademark). Alternatively, the external storage unit 104 may be an external storage unit of another system connected via a network. The combination of the storage media described above may be possible.

The network interface 105 is a communication unit capable of connecting the system to a local network, such as a local area network (LAN), in accordance with a predetermined communication protocol, such as Ethernet (registered trademark), and to a wide-area network, such as the Internet 10.

The bus 106 includes a peripheral component interconnect (PCI) bus, or the like, and is capable of performing data transfer via each module, such as the network interface 105.

Since there is no need for the information management device 100 shown in FIG. 5 to receive input from a user and to explicitly show the processing results to the user, input and output interfaces are not included in the information management device 100. However, in a case where the information management device 100 needs to receive input from an administrator of the information management device 100 and to report the processing results to the administrator, input and output interfaces are installed in the information management device 100. In this case, the input and output interfaces are connected to the bus 106. A keyboard and a mouse are connected to the input interface and a display unit is connected to the output interface.

Figure 6:
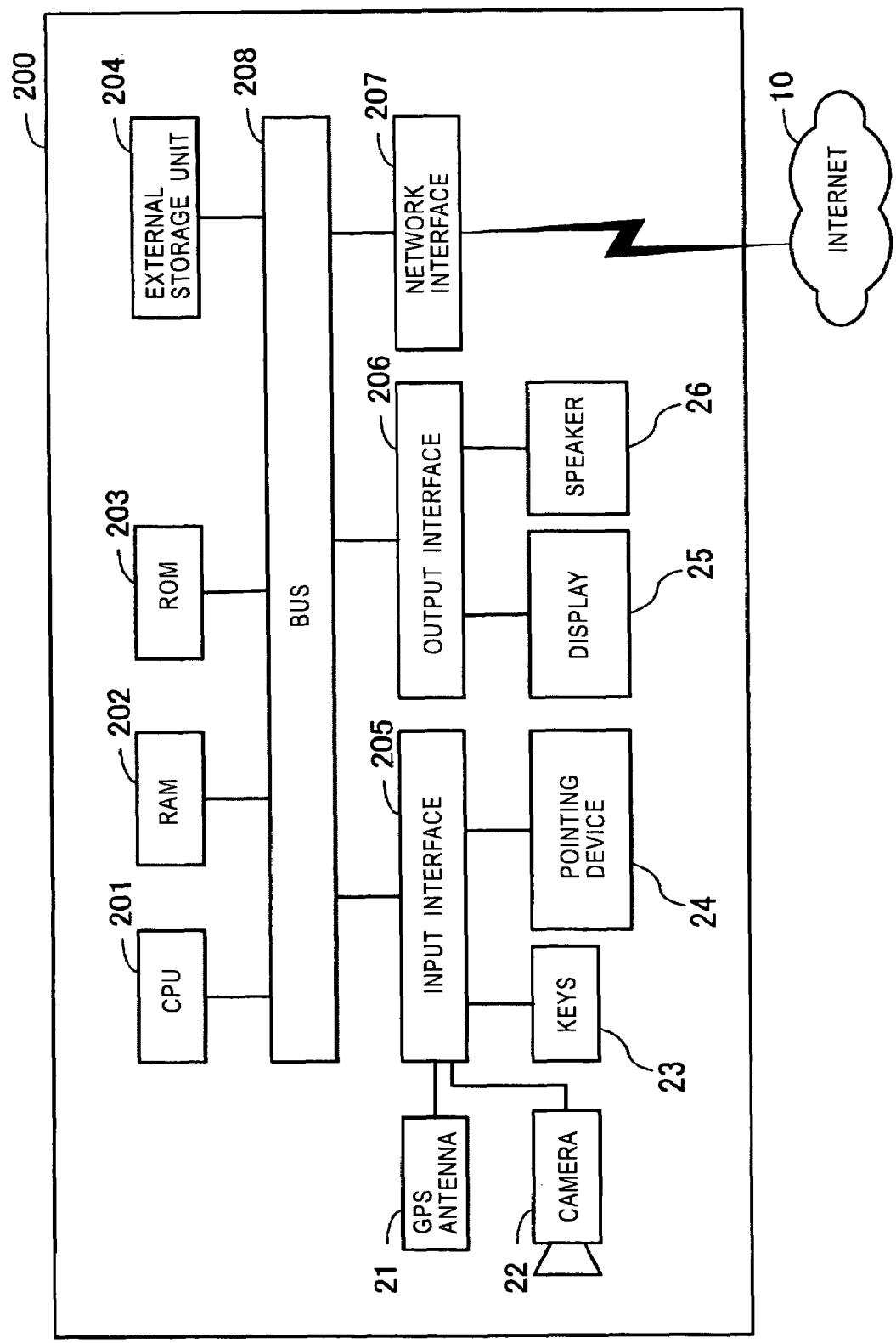
FIG. 6 shows an example of the hardware structure of a portable information terminal device.

FIG. 6 shows an example of the hardware structure of the portable information terminal device 200. In the portable information terminal device 200, a CPU 201, a RAM 202, a ROM 203, an external storage unit 204, an input interface 205, an output interface 206, and a network interface 207 are connected to each other via a bus 208.

The CPU 201 is a main controller for controlling the whole portable information terminal device 200. The CPU 201 executes, for example, an application program for registering and displaying information associated with a location under the control of an OS.

The RAM 202 is a recording medium functioning as a main storage unit. The RAM 202 is used for loading a program code executed by the CPU 201 and temporarily storing operation data of the execution program.

The ROM 203 is a semiconductor memory for permanently storing data. For example, a self-diagnostic test on start-up, a program code for hardware input and output, and the like, are written in the ROM 203.

The external storage unit 204 is a recording medium for storing a program of an executable file format and various types of data. For example, the external storage unit 204 may be a non-volatile semiconductor memory, such as a flash memory. Alternatively, the external storage unit 204 may be an external storage unit of another system connected via a network. The combination of the storage media described above also may be possible.

The input interface 205 connects input units to the portable information terminal device 200. In the example shown in FIG. 6, a GPS antenna 21, a camera 22, keys 23 and a pointing device 24 are connected to the input interface 205. The GPS antenna 21 receives a signal from a geodetic satellite. The camera 22 generates digital image data using a charge-coupled device (CCD) and inputs the image data via the input interface 205. The keys 23 and the pointing device 24 are input units for inputting an instruction from a user.

The output interface 206 presents information to the user. A display 25 and a speaker 26 are connected to the output interface 206. Normally, the display 25 visually shows the details input by users, the processing results, an error or other system messages to users. The speaker 26 presents various types of information through sounds to the user. Electronic information as image data and voice data is output via the display 25 and the speaker 26.

The network interface 207 is a communication unit capable of connecting the system to a local network, such as a LAN, via wireless communication and to a wide-area network, such as the Internet 10.

The bus 208 is capable of performing data transfer via each module, the input and output interfaces and the network interface.

With the structure of the system described above, acquisition of information corresponding to a location and determination of a regional property based on the acquired information can be achieved.

Figure 7:
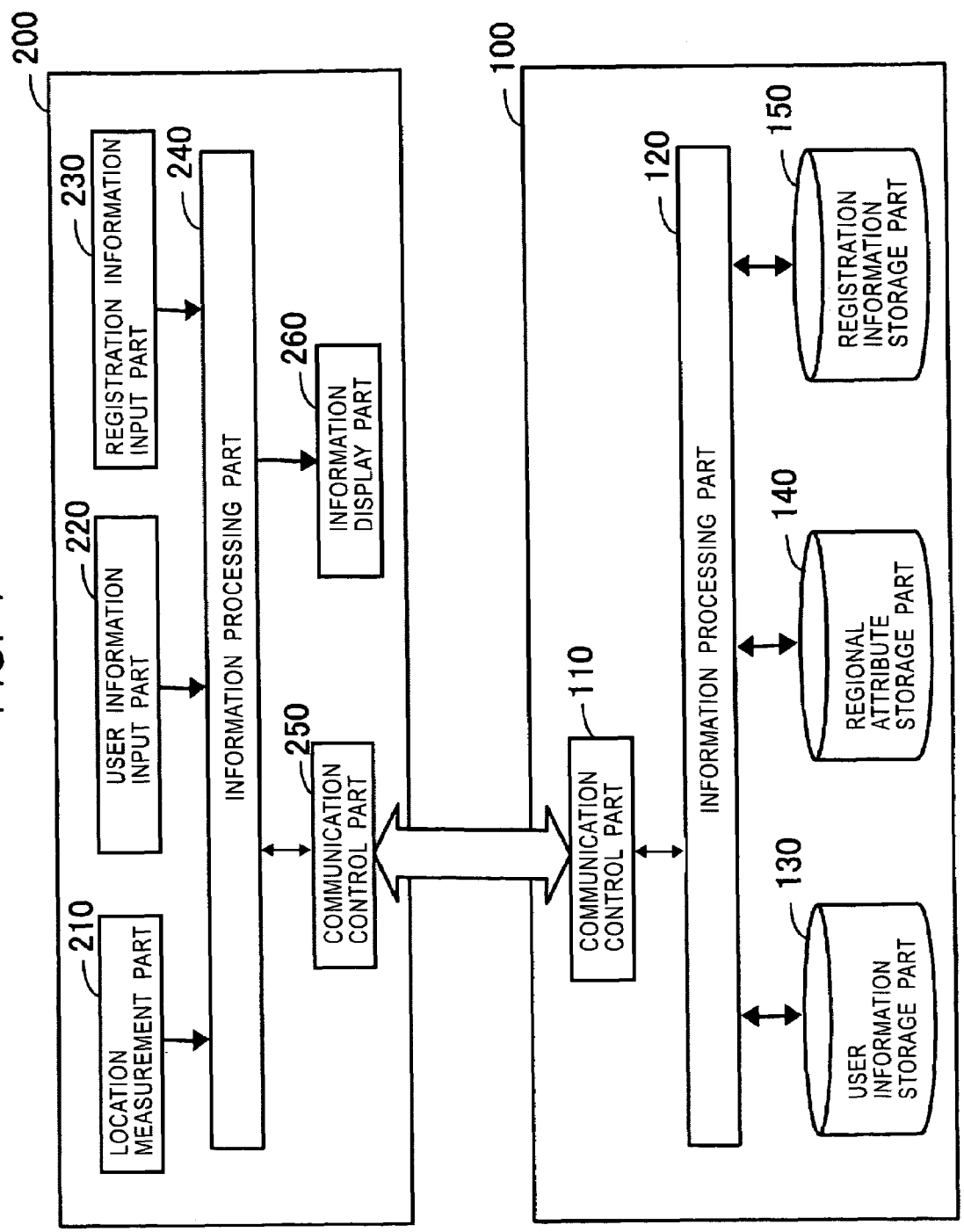
FIG. 7 is a functional block diagram of the portable information terminal device and the information management device according to the above-described embodiment.

FIG. 7 is a functional block diagram of the portable information terminal device 200 and the information management device 100 according to this embodiment. The portable information terminal device 200 is capable of displaying (or entering) and registering (or releasing) electronic information associated with location information. The information management device 100 is capable of defining a semantic attribute of a location (or region) on the basis of the location relationship of the number of portable information terminal devices 200, 200a, . . . .

The function of the portable information terminal device 200 will now be described. The portable information terminal device 200 includes a location measurement part 210, a user information input part 220, a registration information input part 230, an information processing part 240, a communication control part 250 and an information display part 260.

The location measurement part 210 has a function to measure the location of the portable information terminal device 200. For example, the location measurement part 210 measures the location of the portable information terminal device 200 by utilizing a system for determining latitude, longitude and altitude using a satellite, such as a GPS. Also, in a case where the detailed location of the portable information terminal device 200 is not needed and where only a broad location area of the portable information terminal device 200 is needed, a location information service using a portable telephone or a personal handyphone system (PHS) can be used for the location measurement part 210. Furthermore, on the basis of a hotspot where a user uses a wireless LAN or Bluetooth, in which hotspot the user is located, can be determined.

The user information input part 220 inputs user information, such as the age, sex and hobbies/interests of a user, to the information processing part 240. Specifically, the user information input part 220 acquires information, such as the age, sex and hobbies/interests of a user, in accordance with an operation input by the user using a keyboard or the like. The user information input part 220 sends the acquired information to the information processing part 240. In a case where user information is stored in another terminal on the network, the user information may be retrieved in accordance with only a user ID input by the user.

The registration information input part 230 inputs information, such as an image, a voice, text, a three-dimensional model or a computer program, that a user wants to register in association with location information to the information processing part 240. Specifically, the user inputs information that the user wants to "release" using a keyboard or the like. For example, in a case where the user wants to record an image photographed as a memory of travel in association with the destination of the travel, the image is input as registration information. The registration information input part 230 sends the input information to the information processing part 240.

The information processing part 240 sends the information input from the location measurement part 210, the user information input part 220 and the registration information input part 230 to the information management device 100 via the communication control part 250. Also, the information processing part 240 sends the electronic information sent from the information management device 100 to the information display part 260.

The communication control part 250 performs bidirectional communication with the information management device 100. For example, the communication control part 250 controls communication parts using a PHS and a wireless LAN.

The information display part 260 explicitly outputs the details input by the user and the information acquired from the information management device 100 to the display 25 and the speaker 26. Specifically, when the information display part 260 receives image data, the information display part 260 outputs the image data to the display 25 to be displayed on the screen. Also, when the information display part 260 receives voice data, the information display part 260 outputs the voice data to the speaker 26 to be output as a voice.

The structure of the information management device 100 will now be described. The information management device 100 includes a communication control part 110, an information processing part 120, a user information storage part 130, a regional attribute storage part 140 and a registration information storage part 150.

The communication control part 110 performs bidirectional communication with the portable information terminal device 200 using, for example, a PHS and a wireless LAN, as in the communication control part 250 of the portable information terminal device 200.

The information processing part 120 determines an attribute of each region on the basis of information sent from the portable information terminal device 200. Specifically, when the information processing part 120 receives user information via the communication control part 110, the information processing part 120 registers the received user information in the user information storage part 130. Also, the information processing part 120 determines semantic attribute information of a location (or region) on the basis of the location relationship of the registered user information. The information processing part 120 stores the determined results in the regional attribute storage part 140.

Furthermore, the information processing part 120 registers (or releases) electronic information associated with the location in the registration information storage part 150. Also, the information processing part 120 retrieves (or enters) the electronic information stored in the registration information storage part 150.

Information about the user who carries the portable information terminal device 200 is stored in the user information storage part 130. The user information is information about the user whose information is input from the location measurement part 210 and the user information input part 220 of the portable information terminal device 200. The user information is, for example, information about the location, age, sex and hobbies/interests of the user.

Regional attribute information determined on the basis of the user information stored in the user information storage part 130 is stored in the regional attribute storage part 140.

Electronic information associated with location information is stored in the registration information storage part 150.

Although the user information storage part 130, the regional attribute storage part 140 and the registration information storage part 150 are installed inside the information management device 100 in the example shown in FIG. 7, distributed management of the user information storage part 130, the regional attribute storage part 140 and the registration information storage part 150 in a number of devices on the network also may be possible.

A process for retrieving (entering) electronic information performed by the portable information terminal device 200 will now be described with reference to a flowchart shown in FIG. 8.

Figure 8:
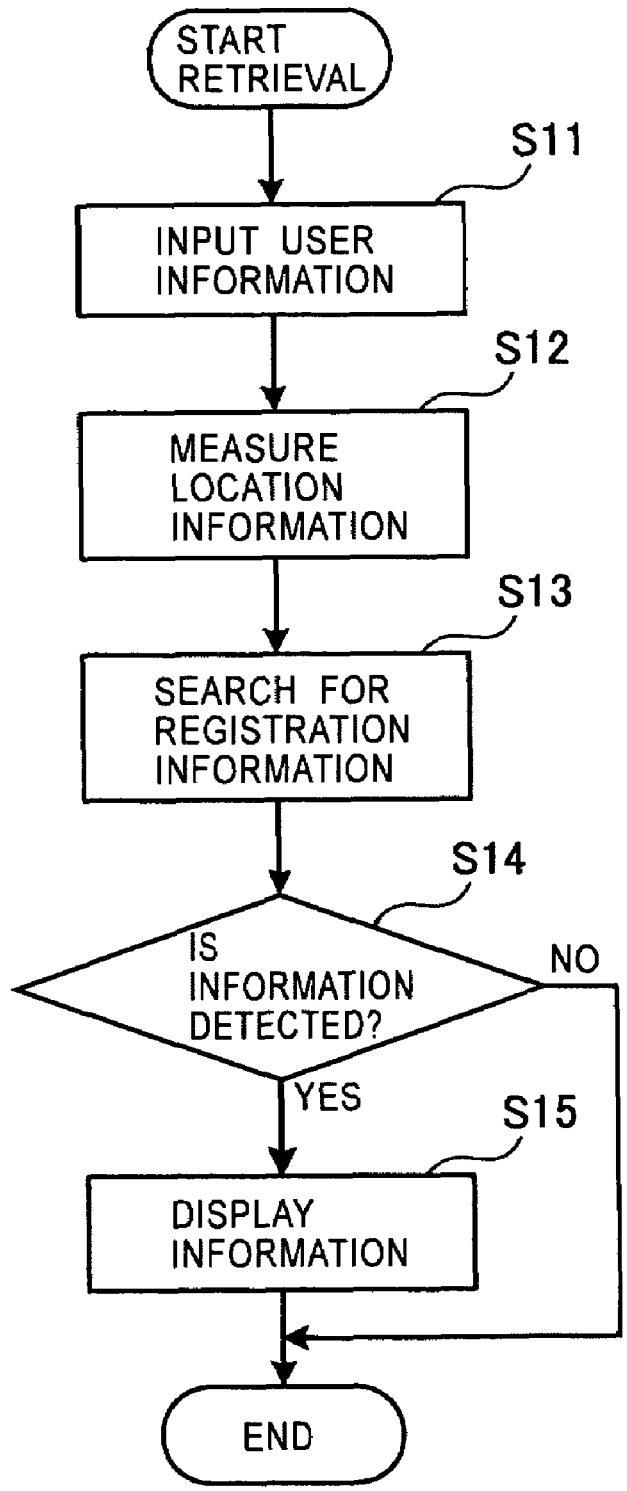
FIG. 8 is a flowchart showing a retrieval process.

FIG. 8 is a flowchart showing the retrieval process. The process shown in FIG. 8 will be explained in accordance with each step number.

(Step S11) The user information input part 220 receives user information input by a user, and inputs the user information to the information processing part 240. The user information input here includes the age, sex, hobbies/interests of the user, the name of a group that the user belongs to, the name of the category of information that the user wants to acquire, and the like.

In a case where the user information is stored in another terminal device on the network, the user information input part 220 may receive only a user ID input by the user. In this case, the information management device 100 receives the user ID and acquires user information corresponding to the user ID from the terminal device on the network.

Also, a category name is used for readily acquiring information desired by the user in the case of the overflow of data. For example, the category name includes category items, such as restaurant information, music information, movie information, and the like.

The input user information is sent to the information management device 100 via the communication control part 250. Then, the information processing part 120 of the information management device 100 stores the user information in the user information storage part 130.

(Step S12) Location information is measured by the location measurement part 210. For example, the latitude, longitude and altitude of the portable information terminal device 200 are measured using a GPS.

The measured location information is sent to the information management device 100 via the communication control part 250. Then, the information processing part 120 of the information management device 100 stores the location information into the user information storage part 130 in association with the user information stored in step S11.

(Step S13) The information processing part 240 searches the registration information storage part 150 of the information management device 100 for appropriate registration information on the basis of the user information input in step S11 and the location information input in step S12. Specifically, the information processing part 240 requests the information management device 100 via the communication control part 250 to perform search. The information processing part 120 of the information management device 100 searches the registration information storage part 150 for appropriate electronic information. The information processing part 120 transfers the search results to the portable information terminal device 200 via the communication control part 110.

(Step 14) The information processing part 240 of the portable information terminal device 200 determines, on the basis of the search results received from the information management device 100, whether or not information is detected. If no information is detected, the process ends. If any information is detected, the process proceeds to step S15.

(Step S15) The information processing part 240 sends the acquired information to the information display part 260, and the information display part 260 displays the information.

Accordingly, user information is acquired at the same time as reception of a request for information retrieval from a user, and the acquired user information is stored in the user information storage part 130. In other words, information (including location) about a user stored in the user information storage part 130 is updated in real time every time the corresponding user performs information retrieval or the like.

Figure 9:
FIG. 9 shows an example of the data structure of a user information storage part.

FIG. 9 shows an example of the data structure of the user information storage part 130. The location, age, sex and hobbies/interests of a user are stored in the user information storage part 130 as user information in association with a user ID, as shown in FIG. 9.

The user ID is used for controlling user's registration information, such as the sex, age, hobbies/interests of the user, the name of a group that the user belongs to, and the like. By using the user ID as a key, the detailed information about the user can be acquired from a terminal (or server) provided on the network.

The location represents the location of the portable information terminal device 200 used by the user. The location is represented in the order of latitude, longitude and altitude (m). Here, north latitude and east longitude are used.

The age represents the age of the user and the sex represents the sex of the user. The hobbies/interests represents information about the hobbies/interests of the user.

In the example shown in FIG. 9, the location of a user whose user ID is "0053" is at latitude 24 north and longitude 135 east and at an altitude of 100 m. For this user, the age is 20, the sex is male and the hobbies/interests is music.

Accordingly, user information registered in association with location enables to determine the attribute of each region. For example, a region where people in their twenties gather is determined by measuring the density of the users in each region on the basis of user information about users whose age is between 20 and 29. In this embodiment, a regional attribute is determined by statistical analysis of user information using indicators, such as the power of influence of each user, the breadth of the power of influence, and the like. The details of the regional attribute determination method will be described below.

In addition to the information shown in FIG. 9, other types of information, such as a moving speed and a feeling of the user at that time, may be registered. The moving speed is calculated for each user every time the location is measured, in accordance with the moving distance from the last location and the elapsed time from the time when the last location information was acquired. Any information is input by the user for the feeling of the user.

The communication relating to the action "enter" performed between the portable information terminal device 200 and the information management device 100 for the processing in step S13 for searching for registration information will now be described with reference to a sequence diagram shown in FIG. 10.

Figure 10:
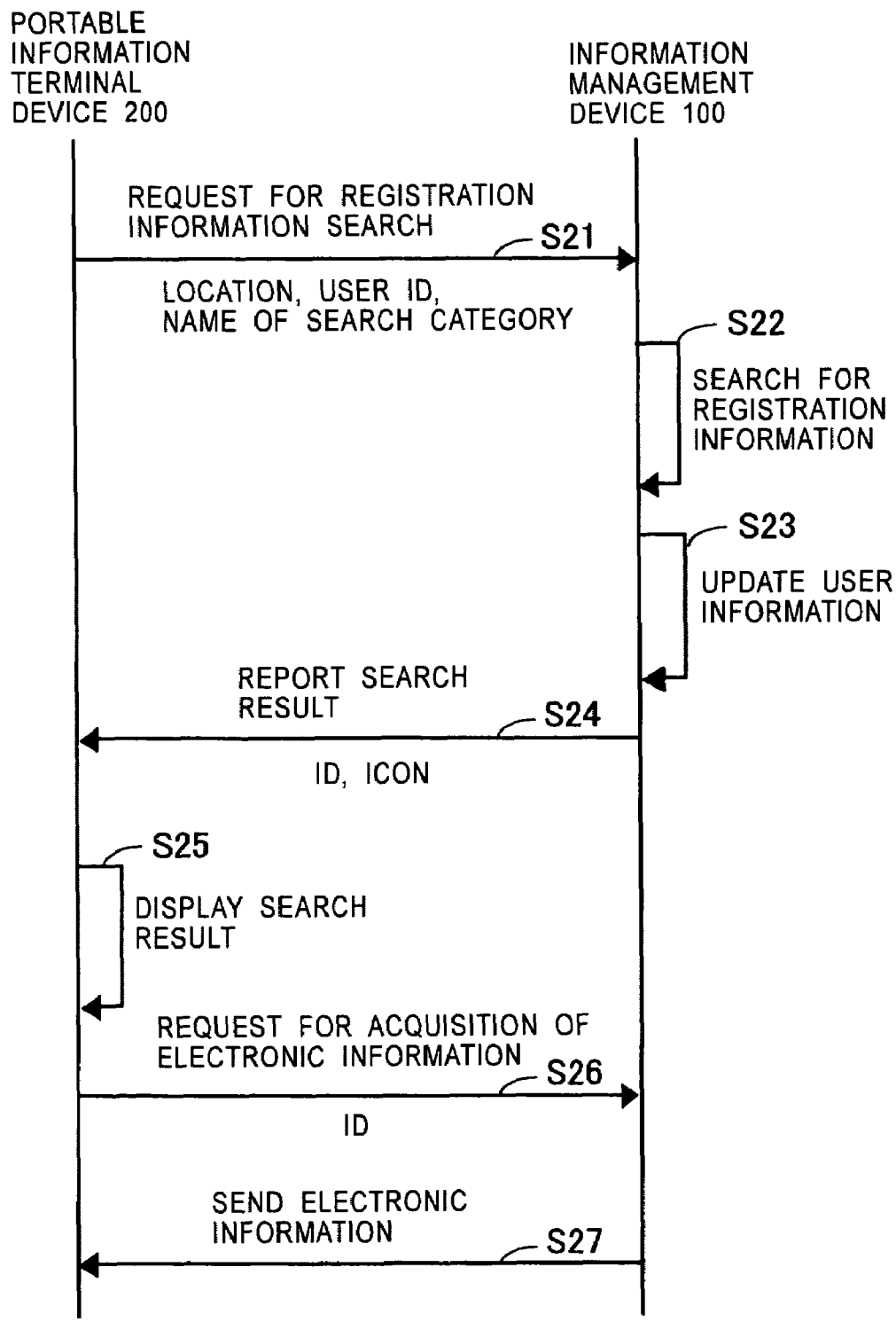
FIG. 10 is a sequence diagram showing a process for searching for registration information.

FIG. 10 is a sequence diagram showing a process for searching for registration information. In FIG. 10, the portable information terminal device 200 is shown in the left section, and the information management device 100 is shown in the right section. The process shown in FIG. 10 will now be explained in accordance with each step number.

(Step S21) The portable information terminal device 200 sends a registration information search request to the information management device 100. At this time, the location of the portable information terminal device 200, its user ID and the name of the search category of information that the user wants to acquire are sent at the same time.

(Step S22) When the information management device 100 receives the registration information search request, information that satisfies the conditions is searched from among stored registration information. In other words, it is checked whether or not the location information sent together with the registration information search request is applied to a region (or "field") defined by the location and the effective area of each piece of registered information.

Also, the process determines whether or not the access right is authenticated on the basis of the user ID, and searches for appropriate electronic information based on the search category name. In this case, only one piece of information that best satisfies the conditions (for example, information about a region nearest to the location) may be searched for. Alternatively, all the information satisfying the conditions may be searched for.

(Step S23) The information management device 100 updates the user information stored in the user information storage part 130. For a user ID that is not stored in the user information storage part 130, user information is newly registered. As such, maintaining the latest user information is useful for defining a regional attribute in real time.

(Step S24) The information management device 100 sends notice of search results to the portable information terminal device 200. At this time, icon information and the ID of the searched information are sent at the same time. The icon information is used for summarizing electronic information. Preferably, icon information has a smaller amount of information than electronic information. For example, only the name of the icon may be sent and the actual data may be held in the portable information terminal device 200. If icons are different depending on the category, category information may be regarded as icon information. Also, brief comments on electronic information may be added.

(Step S25) The portable information terminal device 200 displays the received search results. For example, icons of the searched information may be displayed in a list or the search results may be arranged on a map using location information. An augmented reality system in which search results are combined with an image photographed by a camera is also possible.

(Step S26) In accordance with reception of an instruction from a user, such as selecting a displayed icon, the portable information terminal device 200 sends ID information, together with a request for acquisition of detailed electronic information, to the information management device 100.

(Step S27) The information management device 100, which receives the request for acquisition of the electronic information, sends electronic information corresponding to the ID information to the portable information terminal device 200.

With this mechanism, only necessary electronic information can be transferred, and the burden involved in communication can be reduced. In a case where the search results are displayed as they are without displaying icon information and the like, electronic information may be sent together with the notice of the search results sent from the information management device 100.

A process performed by the portable information terminal device 200 for registering (releasing) electronic information will now be described with reference to a flowchart shown in FIG. 11.

Figure 11:
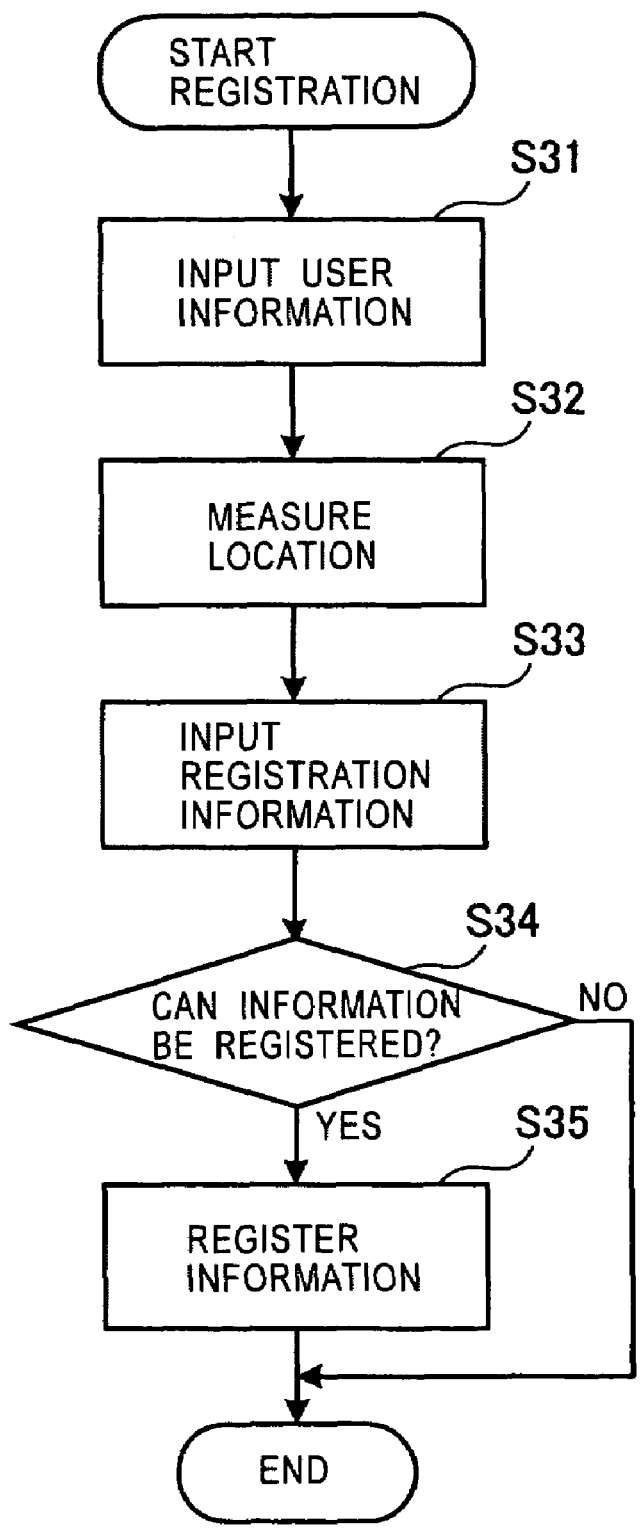
FIG. 11 is a flowchart showing a process for registering electronic information.

FIG. 11 is a flowchart showing the process for registering electronic information. The process shown in FIG. 11 will be explained in accordance with each step number.

(Step S31) The user information input part 220 receives user information, such as the age, sex, hobbies/interests of a user, the name of a group that the user belongs to and the name of the category of information that the user wants to register, and inputs the user information to the information processing part 240. The user information input to the information processing part 240 is sent to the information management device 100 via the communication control part 250. Then, the information processing part 120 of the information management device 100 stores the user information into the user information storage part 130.

(Step S32) The location measurement part 210 measures the location in which information should be registered on the basis of the location, the orientation, and the like, of the portable information terminal device 200. For example, in a case where a building is photographed by a camera of the portable information terminal device 200 and where information is associated with a predetermined floor of the building, the location of the predetermined floor of the building is calculated on the basis of the location and orientation of the portable information terminal device 200 and the distance from the portable information terminal device 200 to the building. For example, the location of the portable information terminal device 200 can be measured using a GPS function. The orientation of the portable information terminal device 200 can be measured using an acceleration sensor. The distance to the building can be measured using a function to measure the distance to a photogenic subject used as an automatic focus function of the camera.

The measured location and information are sent to the information management device 100 via the communication control part 250.

(Step S33) The registration information input part 230 acquires electronic information desired to be registered (in other words, electronic information desired to be "released"), and inputs the electronic information to the information processing part 240. The electronic information input to the information processing part 240 is sent to the information management device 100 via the communication control part 250.

The electronic information includes, for example, image data, moving image data, voice data, text data, three-dimensional model data and a computer program. Such electronic information may be a data file created by a user, a data file stored in external storage, such as a compact disc (CD) or a digital versatile disc (DVD), or a data file acquired from a terminal connected to a network.

(Step S34) The information processing part 120 of the information management device 100 receives the location information and the registration information sent from the portable information terminal device 200, and determines whether or not the registration information can be registered in the location measured in step S32.

The criteria of acceptance or rejection of information registration is defined in advance in the information processing part 120. For example, if information is already registered in the same location, registration of duplicated information is prohibited. Also, the owner of a building can prohibit the location of the building from being associated with information. Also, registration by an inappropriate user can be prohibited in accordance with the user information input in step S31.

If it is determined that information cannot be registered, the process ends. If it is determined that information can be registered, the process proceeds to step S35.

(Step S35) The information processing part 120 registers the location information measured in step S32 and the registration information input in step S33 into the registration information storage part 150. An effective area, an access right, an icon, and the like, may be registered at the same time as accompanying attributes. For example, an effective area is increased as the altitude of the location associated with the information increases. Thus, information associated with an upper floor of a tall building can be referred to from a distance.

According to the flow of the process described above, a user can register (or release) electronic information, such as an image and text, in the registration information storage part 150 in association with any location.

FIG. 12 shows an example of the data structure of the registration information storage part 150. As shown in FIG. 12, a field for an attribute of "field," a field for an attribute for display, and a field for electronic information are provided, in association with an identifier "ID" of information, in the registration information storage part 150. The ID is an identification number allocated so that the information management device 100 can uniquely identify each piece of information and that the information can be managed easily.

In the field for the attribute of "field," attributes associated with the "field" are registered. In the example shown in FIG. 12, fields for the location, the effective area, the access right and the category are provided as attributes of the "field."

In the field for the location, the location of the "field" associated with information is registered. The location is represented in the order of latitude, longitude and altitude (m). Here, north latitude and east longitude are used.

In the field for the effective area, the distance (m) representing the maximum distance from electronic information that is capable of accessing the electronic information is registered. The effective area corresponds to the size of the "field." In other words, only a user who enters the effective area from the location of the "field" can view electronic information associated with the "field."

In the field for the access right, authorization of a user who can access electronic information is registered. For example, the name of a group (or identification information of the group), the name of a user (or identification information of the user), free access (or open to the public), or the like, is designated. If the group name is set as the access right, only a user who belongs to the set group can access the corresponding electronic information. If the user name is set as the access right, only a user who corresponds to the user name can access the corresponding electronic information. If free access (or open to the public) is set as the access right, all the users can access the corresponding electronic information.

In the field for the category, the name of a category item when electronic information is categorized is registered.

In the field for the attribute for display, information indicating an icon and the like representing the appearance of electronic information is registered. For example, the name of an icon is set as the attribute for display.

In the field for the electronic information, the storage destination of electronic information is registered.

In the example shown in FIG. 12, information of ID "1" is associated with the location of latitude 35 north and longitude 145 east and of an altitude of 300 m. The closed region within the effective area "200 m" from this location is a "field." The access right is "groupA" and the category is "music (R&B)." The icon is "MusicA" and the electronic information is stored in "Music/R&B/textA."

It is also possible to consider the access right and the category not as attributes of the "field" but as attributes relating to registration information. In this case, various types of information having different access rights and different category names are registered in the "field." In order to easily provide information suitable for a user, attributes, such as an access right and a category name, are set for each piece of information.

A process performed by the information management device 100 for determining a regional attribute will now be described with reference to a flowchart shown in FIG. 13.

Figure 13:
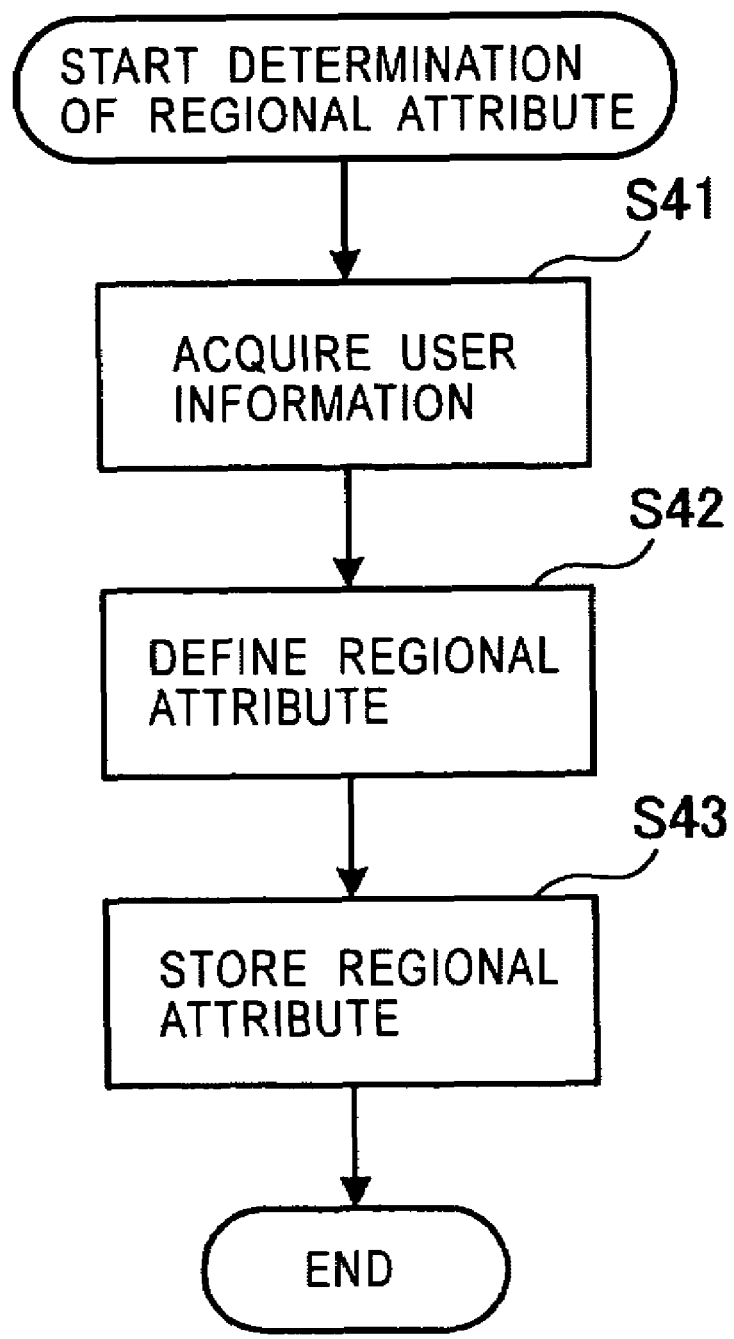
FIG. 13 is a flowchart showing a process for determining a regional attribute.

FIG. 13 is a flowchart showing the process for determining the regional attribute. The process shown in FIG. 13 will be explained in accordance with each step number.

(Step S41) The information processing part 120 acquires a number of pieces of user information stored in the user information storage part 130 in the process of retrieval and registration of electronic information. Since retrieval (or enter) of electronic information is performed with a predetermined interval, the latest user information is always stored in the user information storage part 130.

Although user information is updated in the process for retrieving (or entering) electronic information in this embodiment, an instruction to update user information may be sent from the information management device 100 to each of the portable information terminal devices 200, 200a, . . . , apart from the process for retrieving (or entering) electronic information. In this case, at least information about the current location is replied in response to the instruction to update user information.

Alternatively, user information may be sent from the portable information terminal device 200 to the information management device 100 with a predetermined interval. In this case, the details of the user information storage part 130 of the information management device 100 are regularly updated.

(Step S42) The information processing part 120 determines regional attribute information on the location (or region) based on the user information acquired in step S41. For example, for a region where many users who are in their twenties gather, a regional attribute, such as "a region where people in their twenties gather" is determined and the new added-value of the location (or region) information is defined. In other words, semantic information, which is different from the geographical information, is added to the location (or region) information.

(Step S43) The information processing part 120 stores the regional attribute defined in step S42 into the regional attribute storage part 140.

Figure 14:
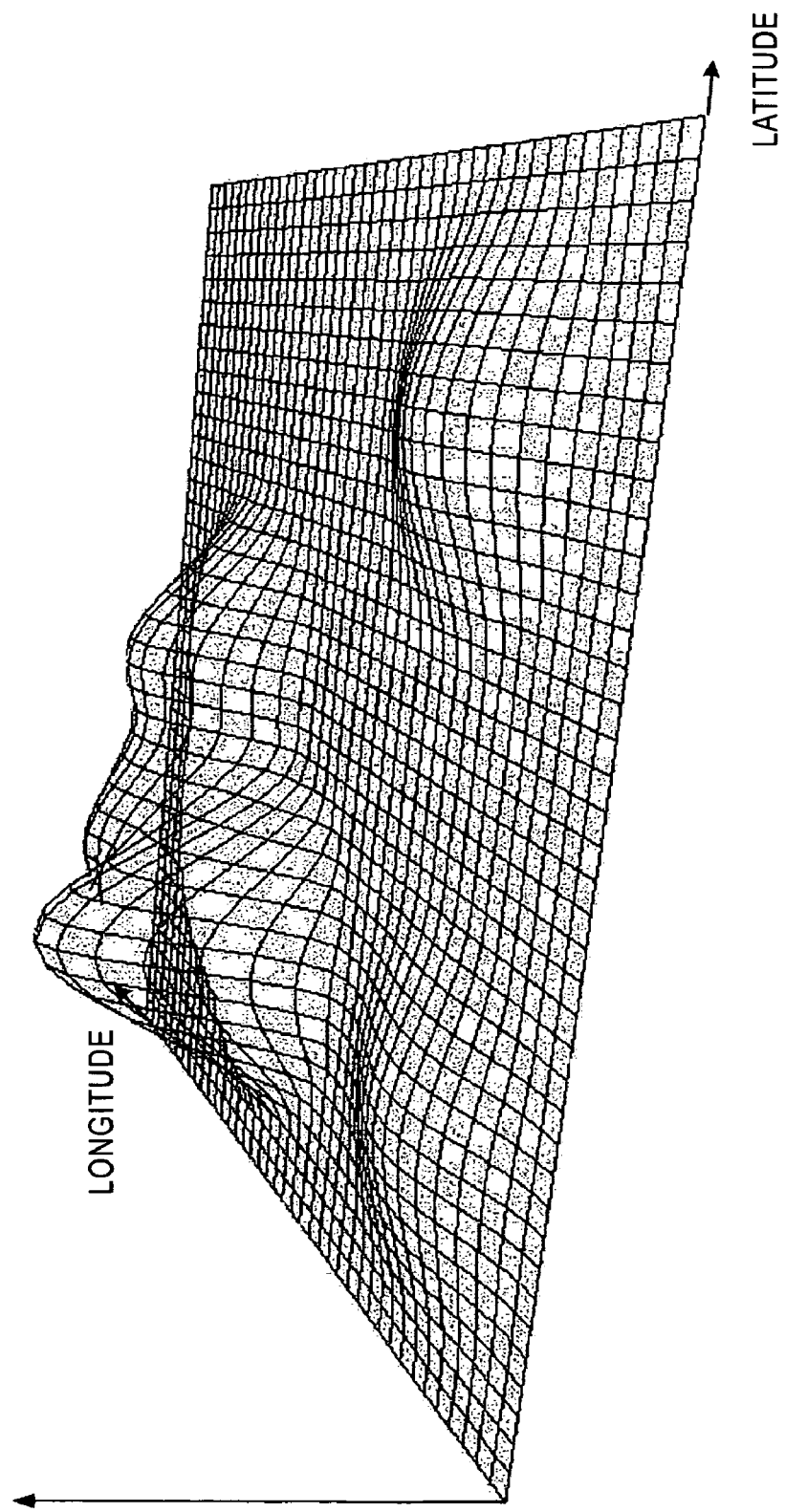
FIG. 14 shows an example of data stored in a regional attribute storage part.

FIG. 14 shows an example of data stored in the regional attribute storage part 140. Regional attribute data stored in the regional attribute storage part 140 is shown by way of a graph in FIG. 14. Here, an example of giving an attribute, such as "a region where people in their twenties gather" is shown. In FIG. 14, the level represents location information, in other words, the latitude and longitude (here, altitude is omitted). Also, the height represents the region degree representing the density of people in their twenties gathering in a region. In other words, a rise in FIG. 14 represents a region where people in their twenties gather. By giving an attribute as described above, in order to distribute advertisements for people in their twenties as a target, the best region where people in their twenties gather is determined in real time. Accordingly, the advertisements can be targeted at the region.

A method for calculating the regional attribute data shown in FIG. 14 will now be described. In this embodiment, effects on a region produced by respective users are calculated by statistic processing, and a regional attribute is determined by combining the effects on each region produced by the users.

Figure 15:
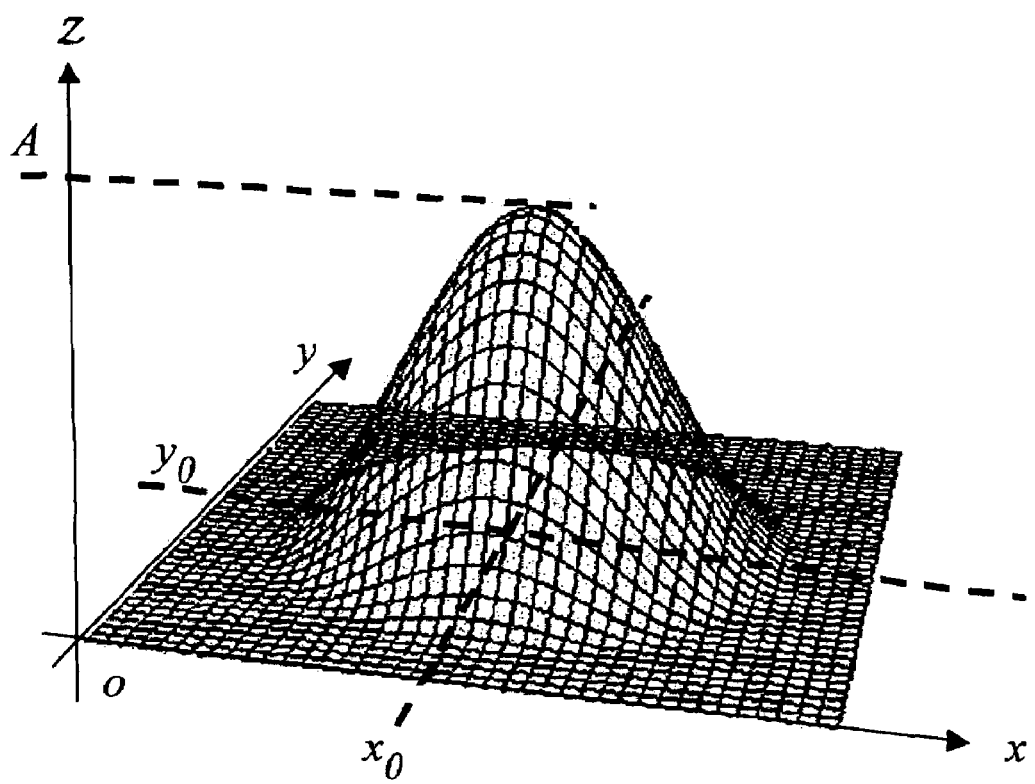
FIG. 15 is a graph showing an effect on a region produced by a user.

FIG. 15 is a graph showing the effect on a region produced by a user. Here, the x-axis represents latitude, the y-axis represents longitude, and the z-axis represents an effect on a regional attribute produced by a user (for example, the region degree representing the density of people in their twenties gathering in the region). Also, x0, y0 represents the location of the user.

Such an effect on a region produced by a user can be calculated from the following equation:

$$z = \frac{A}{2\pi\sigma^2} e^{-\frac{(x-x_0)^2 + (y-y_0)^2}{2\sigma^2}} \quad (1)$$

Equation 1 explains a regional attribute defined for each user when the information management device 100 according to the present invention performs regional attribute definition processing.

In Equation 1, A represents the power of influence on giving an attribute. For example, the power of influence A is 1 for a user who is in his/her twenties and the power of influence A is 0 for a user who is not in his/her twenties. In other words, any user who is not in his/her twenties is independent of giving an attribute to a region.

Also, the power of influence A may be represented by continuous values 0 to 1. For example, when an attribute, such as "a region where people who like music gather" is given, the degree of how much a user likes music is represented by the power of influence A using a continuous value. The power of influence A may be changed in accordance with the number of CDs that the user purchases per month.

In Equation 1, σ represents the breadth of the power of influence. In accordance with the breadth of the power of influence, a user who has the power of influence on a broad area and a user who has the power of influence on a narrow area can be set. For example, the power of influence exerted by a user who stays in the same place for a long time is set to be in a narrow area and the power of influence exerted by a user who moves is set to be in a broad area.

Figure 16:
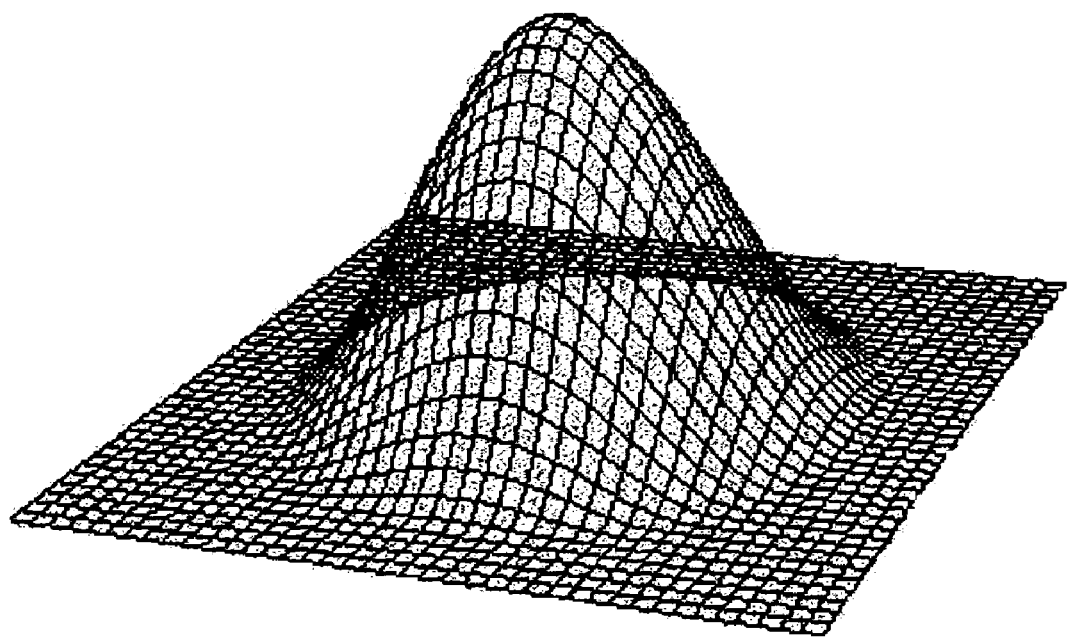
FIG. 16 is a graph showing an effect on a region produced by a user whose power of influence on giving an attribute is large.

FIG. 16 is a graph showing the effect on a region produced by a user whose power of influence on giving an attribute is large. In the example shown in FIG. 16, the power of influence A is 0.98.

Figure 17:
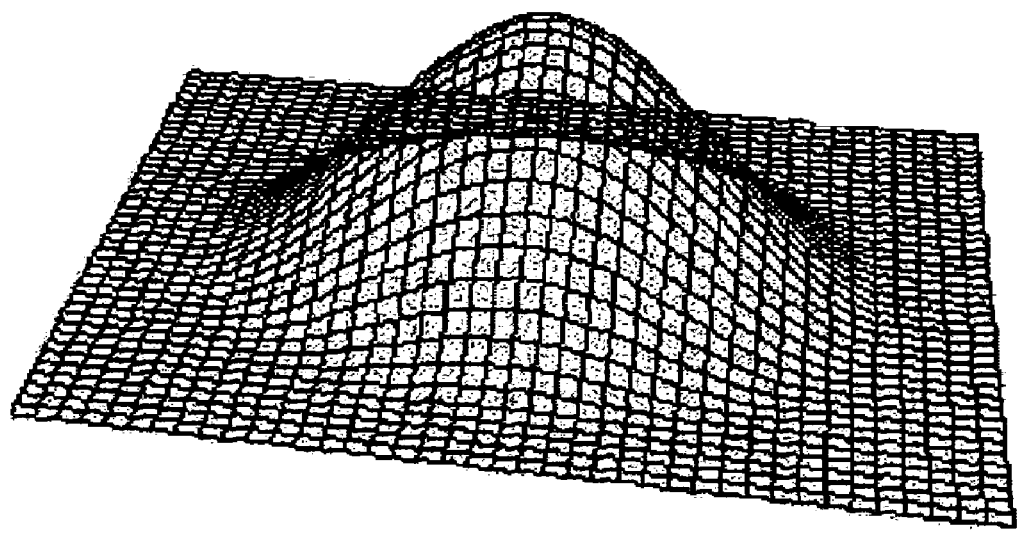
FIG. 17 is a graph showing an effect on a region produced by a user whose power of influence on giving an attribute is small.

FIG. 17 is a graph showing the effect on a region produced by a user whose power of influence on giving an attribute is small. In the example shown in FIG. 17, the power of influence A is 0.46.

A comparison between the examples shown in FIGS. 16 and 17 shows that an effect on the location of a user and on an area surrounding the user increases as the power of influence increases.

Figure 18:
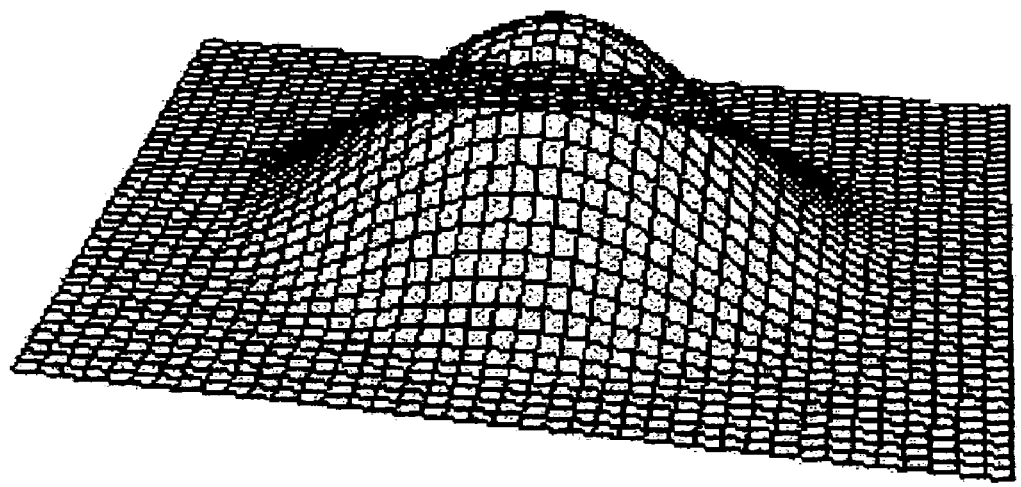
FIG. 18 shows a graph showing an effect on a region produced by a user whose breadth of the power of influence is wide.

FIG. 18 shows a graph showing the effect on a region produced by a user whose breadth of the power of influence is wide. In the example shown in FIG. 18, the breadth σ is 0.93.

Figure 19:
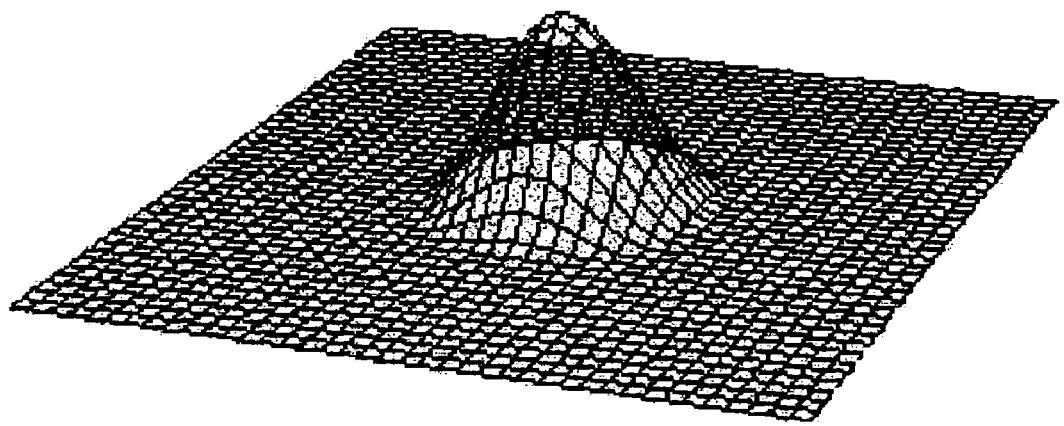
FIG. 19 shows a graph showing the effect on a region produced by a user whose breadth of the power of influence is narrow.

FIG. 19 is a graph showing the effect on a region produced by a user whose breadth of the power of influence is narrow. In the example shown in FIG. 19, the breadth σ is 0.52.

A comparison between the examples shown in FIGS. 18 and 19 shows that an effect is exerted on a broader area centered on the location of the user in accordance with an increase in the breadth of the power of influence.

Accordingly, for the same power of influence, a larger effect is exerted on a surrounding area as the breadth of the power of influence increases. In other words, in accordance with an increase in the breadth σ of the power of influence, the decreasing rate of a regional attribute in accordance with moving away from the location of the user is decreased.

Accordingly, attribute giving as shown in FIG. 14 for user information stored in the user information storage part 130 can be performed by defining the function of Equation 1 and by obtaining the sum.

Given any attribute, such as "a region where people in their twenties gather," "a region where people who like music gather," and "a region where people who like fishing gather," is achieved by setting the power of influence of each user.

As described above, an attribute can be provided to location (or regional) information on the basis of a number of pieces of user information including location information. Such attribute giving can be performed in real time. Also, such attribute giving is applicable to advertising and the like. For example, although an advertising provider who wants to display an advertisement targeting people who are in their twenties in association with location information has displayed an advertisement in a "field" only having geographical information, such as Shibuya or Shinjuku, adding definition to the "field" on the basis of the regional attribute stored in the regional attribute storage part 140 allows an advertisement to be displayed in a "field" having semantic information, such as a region where people in their twenties gather. Thus, more effective advertising effect can be expected.

Also, the regional attribute storage part 140 may be arranged in the portable information terminal device 200 so that each user can define a desired regional attribute. For example, extraction of a place where users having the same food preference gather enables search of a new restaurant or shop.

The processing functions described above can be effected using a computer. In this case, a regional attribute determination program in which the processing details of functions included in the information management device 100 and the portable information terminal device 200 is provided. The processing functions described above can be achieved by executing the regional attribute determination program on the computer. The program in which the processing details are written can be recorded on a computer-readable recording medium. The computer-readable recording medium may be a magnetic recording medium, an optical disc, a magneto-optical recording medium or a semiconductor memory. The magnetic recording medium may be a hard disk drive (HDD), a flexible disk (FD), a magnetic tape, or the like. The optical disc may be a digital versatile disc (DVD), a digital versatile disc random access memory (DVD-RAM), a compact disc read only memory (CD-ROM), a compact disc-recordable/rewritable (CD-R/RW), or the like. The magneto-optical recording medium may be a magneto-optical disc (MO) or the like.

In a case where the program is distributed, the program may be recorded on, for example, a portable recording medium, such as a DVD or a CD-ROM, which is then sold. Also, the program may be stored in a storage unit of a server computer so that the program can be transferred from the server computer to another computer via a network.

A computer executing the program, for example, stores the program stored in the portable recording medium or the program transferred from the server computer into its own storage unit. The computer reads the program from its own storage unit and performs processing in accordance with the program. Also, the computer may read the program directly from the portable recording medium to perform processing in accordance with the program. Also, the computer may perform processing in accordance with the received program every time the program is transferred from the server computer.

Although the present invention has been described with reference to specific embodiments, those of skill in the art will recognize that changes may be made thereto without departing from the spirit and scope of the present invention as set forth in the hereafter appended claims.

The invention claimed is:

1. A regional attribute determination system for determining a regional attribute representing an attribute of people gathering in a particular region, the system comprising:
an input device;
a display device;
a processor;
a memory device which stores a plurality of instructions, which when executed by the processor, cause the processor to operate with the display device and the input device to:
(a) acquire first user information including a first location and a first attribute of a first user from a first portable information terminal device used by the first user;
(b) acquire second user information including a second location and a second attribute of a second user from a second portable information terminal device used by the second user;
(c) store: the first user information of the first user; and (ii) the second user information of the second user, wherein: (i) the stored first user information is updated in real time every time the first user performs information retrieval; and (ii) the stored second user information is updated in real time every time the second user performs information retrieval;
(d) calculate a first effect on a region by multiplying a first power of influence, the first power of influence being based on said first attribute, wherein said first effect is:
(i) produced by said first user;
(ii) calculated using a regional attribute defining function;
(iii) reduced as said first user moves away from said region; and
(e) calculate a second effect on the region by multiplying a second power of influence, the second power of influence being based on said second attribute, wherein said second effect is:
(i) produced by said second user;
(ii) calculated using a regional attribute defining function;
(iii) reduced as said second user moves away from said region; and
(f) determine the regional attribute by combining: (i) the first calculated effect on each region produced by the first user; and (ii) the second calculated effect on each region produced by the second user.

2. A machine readable media storing a regional attribute determination program for determining a regional attribute representing an attribute of people gathering in a particular region, the program structured to cause a computer to:
acquire first user information including a first location and a first attribute of a first user from a first portable information terminal device used by the first user;
acquire second user information including a second location and a second attribute of a second user from a second portable information terminal device used by the second user;
store: (i) the acquired first user information of the first user; and (ii) the acquired second user information of the second user, wherein: (i) the stored first user information is updated in real time every time the first user performs information retrieval; and (ii) the stored second user information is updated in real time every time the second user performs information retrieval;
calculate a first effect on a region by multiplying a first power of influence, the first power of influence being based on said first attribute, wherein said first effect is:
(i) produced by said first user;
(ii) calculated using a regional attribute defining function;
(iii) reduced as said first user moves away from said region; and
calculate a second effect on the region by multiplying a second power of influence, the second power of influence being based on said second attribute, wherein said second effect is:
(i) produced by said second user;
(ii) calculated using a regional attribute defining function;
(iii) reduced as said second user moves away from said region; and
determine the regional attribute by combining: (i) the first calculated effect on each region produced by the first user; and (ii) the second calculated effect on each region produced by the second user.

* * * * *